No. 616,450. Patented Dec. 27, 1898.
G. J. BRANSFORD.
COLTER FOR PLOWS.
(Application filed Aug. 7, 1897.)
(No Model.)
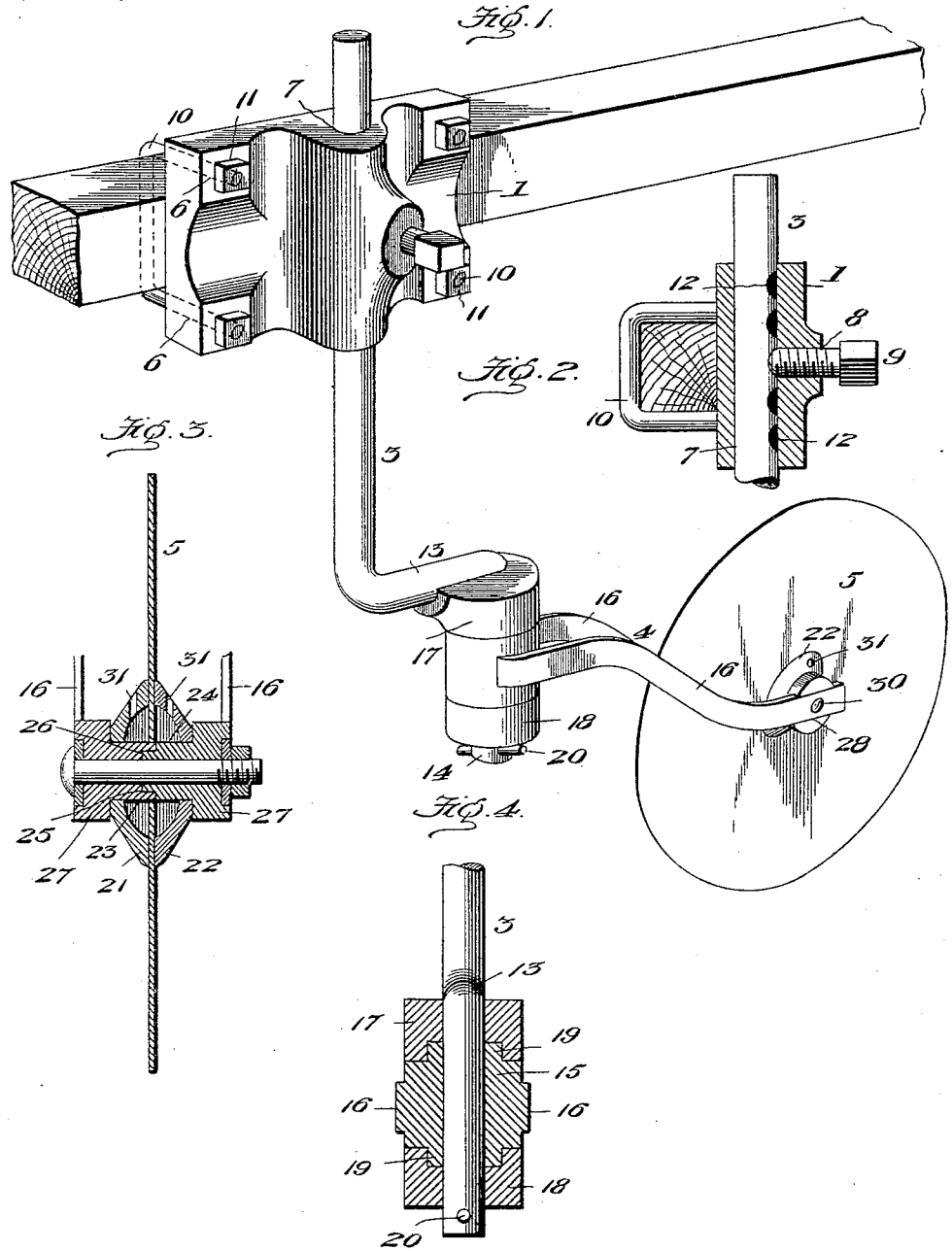

UNITED STATES PATENT OFFICE.

GIDEON J. BRANSFORD, OF CAYCE, KENTUCKY.

COLTER FOR PLOWS.

SPECIFICATION forming part of Letters Patent No. 616,450, dated December 27, 1898.

Application filed August 7, 1897. Serial No. 647,447. (No model.)

*To all whom it may concern:*

Be it known that I, GIDEON J. BRANSFORD, a citizen of the United States, residing at Cayce, in the county of Fulton and State of Kentucky, have invented certain new and useful Improvements in Colters for Plows; and I do hereby declare the following to be a full, clear, and exact description of the invention, such as will enable others skilled in the art to which it appertains to make and use the same.

My invention relates to improvements in colters for plows and like agricultural implements; and the primary object that I have in view is to provide an improved colter of simple construction which will not work loose and careen after it has been in service on the plow.

A further object of the invention is to provide an improved colter which will operate efficiently in cutting the weeds even as far down as the axle of the implement before the front part thereof will drag on the ground.

A further object of the invention is to provide an improved construction and arrangement of the parts of the bearing for the revolving colter in which the entrance of dirt, &c., to the bearing is effectually excluded to prevent wear of the working parts.

A further object of the invention is to provide an improved form of clamp by which the colter may be held rigidly and securely on the beam, against working loose thereon, and still be capable of adjustment vertically as may be desired.

With these ends in view my invention consists in the novel combinations of elements, and in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view of a colter constructed in accordance with my invention. Fig. 2 is a vertical sectional view taken longitudinally through the colter. Fig. 3 is an enlarged vertical sectional view taken transversely through the colter and its hub on the plane indicated by the dotted line 3 3 of Fig. 2. Fig. 4 is a detail view of the hanger with the various parts of the bearing for the rolling colter.

Like numerals of reference denote corresponding parts in all the figures of the drawings.

My improved colter comprises a clamp-bracket 1, a vertical stem 3, a hanger 4, the rotary colter blade or disk 5, and the bearing, the peculiar and detailed construction of which I will now proceed to describe.

The clamp-bracket 1 is preferably a single casting of substantially rectangular form. This bracket has a flat bearing-face to enable it to fit solidly against one side of the plow-beam, and in the corners of this clamp-bracket are provided transverse openings 6. The clamp-bracket is further provided with a vertical socket or opening 7, and with this socket communicates a tapped opening 8, in which works a binding-screw 9. The clamp-bracket is fastened to the plow-beam by means of the yokes 10 10, which are arranged to embrace the plow-beam and which have their threaded extremities passed through the openings 6 in the corners of the clamp-bracket to receive the nuts 11, which are screwed on said threaded extremities of the yokes and serve to bind against the clamp-bracket. These yokes serve to hold the clamp-bracket firmly in place on the plow-beam and to keep it from slipping or displacement thereon when the colter is in service.

The vertical stem 3 of the attachment is fitted in the socket or opening 7 of the clamp-bracket so as to be adjustable vertically therein for the purpose of raising or lowering the colter to the desired height. This stem 3 is provided at intervals around its periphery and along its length with a series of depressions 12, which constitute seats for the inner end of the binding-screw. This construction enables the binding-screw to engage firmly with the stem to hold the latter at the desired adjustment and without danger of slipping with relation to the clamp-bracket and the plow-beam. The lower end of this vertical shank 3 is provided with an offstanding arm 13, which is arranged in a horizontal position and substantially at right angles to the length of the stem, and the stem is further provided at the free end of the horizontal arm with a pendent pintle 14. I prefer to make the stem 3 of rod or bar metal and to bend the latter to provide the offstanding and pendent portions 13 14; but the stem may be cast or otherwise constructed to provide or form the elements 13 14. On the pendent pintle 14 of the stem is loosely fitted the hanger 4 of the attachment, and this hanger is arranged to turn or play freely in a horizontal plane, but at the same time it is carried by the stem so as to be adjustable vertically therewith.

The hanger 4 consists of a hub 15 and a pair of bent arms 16, all of which parts may be cast in a single piece of metal, or they may be separately formed and attached or united together in any suitable way. The hub 15 of the hanger 4 has a cylindrical bore or passage to enable the hub to fit snugly on the pintle 14 of the stem 3 and to turn freely thereon in a horizontal plane; but the hanger is not capable of any vertical play on the stem, although it is adjustable up and down therewith, as has been explained, for the purpose of regulating the penetration of the colter-blade 5. As shown by the drawings, I fit to the stem 3 a stop-flange 17 to limit the upward movement of the hub of the hanger, and a similar stop-flange 18 is fitted to the stem and to the lower side of the hanger-hub to serve as a bearing therefor and as a means for preventing downward play or displacement of the hanger-hub upon the pintle of the stem. The ends of hub-hanger 15 are provided with the projecting flanges 19, which fit in recesses in the edges of the stop-flanges 17 18, and thus connect the parts together in a manner to exclude dirt from working between the parts. The stop-flange 17 may be made either as a part of the arm 13 of the stem, in which case it may be cast as an integral downwardly-projecting shoulder, or said stop-flange 17 may be made separate from the stem and be fitted thereto removably, so as to be held up in position against the offstanding arm 13 by the hub of the hanger. The lower stop-flange 18 is held in place by a pin which passes through the lower extremity of the pintle 14, as shown at 20 in the drawings, or a nut may be screwed on said lower extremity of the pintle 14, the latter being threaded for the nut.

The colter-blade 5 is in the form of a disk with a sharpened periphery. On the faces of this disk, at the center thereof, are fastened hollow bosses 21 22, which project laterally from the faces of the disk and which are attached thereto in any suitable way. Through these hollow bosses and an axial opening in the disk or blade itself passes a sectional tubular axle and a single continuous bolt which serves to attach the colter-disk to the arms 16 of the hanger in a manner to enable the disk or blade to turn freely within the hanger and at the same time exclude the dirt from the bearing in a very effectual way.

The tubular axle consists of two sections 23 24, which are inserted through the bosses 21 22 from opposite sides of the colter-disk, so as to meet each other about midway of the length of the colter-hub formed by the bosses and the axial opening in the blade or disk, and the inner meeting ends of said axle-sections may be and preferably are coupled to each other by means of a tenon 25 on one section fitting in a notch or mortise 26 on the other section, as shown by Fig. 4. The axle-sections are provided at their outer ends with the enlarged or flanged heads 27, which are adapted to abut against the hub-bosses on the colter-disk, and to thus fit snugly thereto to exclude the dirt from entering the hub opening or passage, and said heads 27 of the axle-sections are provided with grooves or seats 28 in their outer exposed faces for the purpose of receiving the free ends of the arms 16 of the hanger, whereby the axle-sections are coupled with the hanger-arms and with each other in a manner to prevent rotation of the axle within the hub of the colter disk or blade. The continuous bolt 30 may be inserted from either side of the hanger, and it passes all the way through the arms of the hanger and the hollow or tubular sections of the axle, the headed end of the bolt bearing against one arm of the hanger, while the threaded end of the bolt receives the nut which bears against the other arm of the hanger.

From the foregoing description, taken in connection with the drawings, it will be seen that I have provided an improved construction of the journal for the rotary colter disk or blade, in which the parts are arranged to permit free rotation of said disk or blade and to thoroughly and effectually exclude dirt from entering the bearing, whereby wear of the working parts is reduced to a minimum and the colter-blade is held from careening on the plow-beam when it is in service. The hanger-clamp is firmly held on the beam to prevent it from working loose or slipping out of the place. The stem is gripped firmly in the hanger-clamp, and it may be adjusted vertically therein to sustain the hanger and the colter-blade at any desired elevation. The parts are all easily separated for the purpose of inspection, repairs, and renewal of any worn parts. The hub-bosses of the colter-disk are provided with oil holes or cups 31, by which the axle-hub may be lubricated in order to reduce the wear to a minimum and keep the parts in good working condition.

In my improved colter the disk or blade is supported in such a manner and it works so freely that the disk will cut down to the axle before it will drag on the ground, and the efficiency of the colter is thus promoted.

Of course the colter may be attached to any plow, and it may be easily and quickly applied or removed, as occasion may require, by simply manipulating the nuts of the clamping-yokes.

I am aware that changes in the form and proportion of parts and in the details of construction of the devices herein shown and described as the preferred embodiment of my invention may be made by a skilled mechanic without departing from the spirit or sacrificing the advantages of my invention. I therefore reserve the right to make such alterations and modifications as fairly fall within the scope of my invention.

Having thus fully described my invention, what I claim as new, and desire to secure by Letters Patent, is—

1. The combination with a clamp-bracket, of a vertical arm mounted therein and provided, at its lower part, with a horizontal arm and with a pintle which depends from said horizontal arm, the upper and lower bearing-flanges spaced vertically on said pintle and provided with grooves in their opposing faces, a hanger having a ribbed hub fitted loosely on the arm-pintle between the bearing-flanges and with its ribs fitting in the grooves thereof, and a colter journaled in said hanger, substantially as described.

2. In a colter, the combination with a hanger, of the two-part tubular axle having the shouldered members thereof interlocked together at their inner ends and also interlocked at their outer ends individually with the hanger-arms, and a blade or disk having its hub loosely fitted on said axle to rotate freely thereon and confined against displacement between the shoulders of the axle sections or parts, substantially as described.

3. In a colter, the combination with a hanger, of the two-part tubular axle the members of which are grooved at their outer ends and interlocked with the hanger-arms and are also interlocked with each other at their inner ends to be held against axial rotation, a clamping-bolt which passes through the hanger-arms and axle, and a disk or blade mounted loosely on and within exposed flanges of said two-part axle, substantially as described.

4. In a colter, the combination with a hanger, of the two-part tubular axle having their flanged and grooved outer ends interlocked with the hanger-arms and also interlocked together at their inner adjacent ends, the bearing-bosses fitted loosely on the axle and between the external flanges thereof, a disk or blade clamped between said bosses to rotate therewith on the axle, and a clamping-bolt, substantially as described.

In testimony whereof I affix my signature in presence of two witnesses.

GID. J. BRANSFORD.

Witnesses:
B. H. BRANSFORD,
A. J. HARPOLE.